United States Patent [19]

Ito

[11] Patent Number: 4,998,051
[45] Date of Patent: Mar. 5, 1991

[54] ADAPTIVE CONTROL SYSTEM

[75] Inventor: Osamu Ito, Kadoma, Japan

[73] Assignee: Matsushita Electric Industrial Co., Ltd., Osaka, Japan

[21] Appl. No.: 497,257

[22] Filed: Mar. 22, 1990

[30] Foreign Application Priority Data

Mar. 23, 1989 [JP] Japan .................................. 1-70861
Mar. 23, 1989 [JP] Japan .................................. 1-70859

[51] Int. Cl.⁵ ............................................ G05B 13/00
[52] U.S. Cl. ................................ 318/632; 318/568.22;
318/561; 318/631; 318/571; 364/148; 364/165;
901/9
[58] Field of Search .......................... 318/560-634;
364/148-166; 901/3, 9, 12, 18, 19, 20, 23

[56] References Cited

U.S. PATENT DOCUMENTS

| 3,648,031 | 3/1972 | Neal | 318/616 X |
|---|---|---|---|
| 4,437,045 | 3/1984 | Mitsuoka | 901/9 X |
| 4,466,054 | 8/1984 | Shigemasa et al. | 318/636 X |
| 4,540,923 | 9/1985 | Kade et al. | 318/631 X |
| 4,609,855 | 9/1986 | Andrews | 318/561 |
| 4,639,652 | 1/1987 | Takahashi et al. | 318/568.22 |
| 4,860,215 | 8/1989 | Seraji | 364/513 |
| 4,912,387 | 3/1990 | Moulds, III | 318/629 |

OTHER PUBLICATIONS

Proceedings of 1988 American Control Conference, "A Time Delay Controller for Systems with Unknown Dynamics", pp. 904-911.

Primary Examiner—William M. Shoop, Jr.
Assistant Examiner—Paul Ip
Attorney, Agent, or Firm—Wenderoth, Lind & Ponack

[57] ABSTRACT

An adaptive control system, for a plant such as a servo motor, a heat pump and the like where its input distribution matrix is known and the number of effective inputs is the same as the number of independent outputs, comprising: an unknown dynamics value production circuit for producing an unknown dynamics value by adding a derivative value of a detected state output value of said plant, negative quantity of multiplication of an input value of said plant and an input distribution matrix value of said plant, and negative quantity of a known value of said plant; a non-identity filter, except for a time delay element, for producing a filtered unknown dynamics value which is close to but not exactly the same as said unknown dynamics value; a control input value production circuit for producing a control input value to said plant by using said filtered unknown dynamics value.

20 Claims, 12 Drawing Sheets

ADAPTIVE CONTROL SYSTEM

BACKGROUND OF THE INVENTION

1. Field of the Invention

This invention relates to an adaptive control system which controls a physical plant such as a servo motor, a heat pump and the like with unknown dynamics and disturbances.

2. Description of the Prior Art

A conventional adaptive control system, the Time Delay Controller (TDC), has been proposed by K. YOUCEF-TOUMI and O. ITO, the inventor of this invention, in a paper, "A Time Delay Controller for Systems with Unknown Dynamics" in pages 904 through 911 of the Proceedings of 1988 American Control Conference.

The TDC deals with a physical plant expressed in a state space dynamic equation where an input distribution is known and the number of effective inputs is the same as the number of independent outputs. For this class of physical plants, an object of the TDC is to eliminate an error, which is defined as a difference between a desired output of a reference model and an actual output of a physical plant. In order to achieve the object, an unknown dynamics value is estimated using a time delay based on observation of inputs and state outputs. The TDC cancels the estimated unknown dynamics value, cancels an undesired known dynamics value, inserts a desired dynamics value of a reference model, and adjusts dynamics of the error. The above mentioned paper shows the TDC's excellent robustness properties to unknown dynamics and disturbances.

However, the TDC has the following three disadvantages from a practical point of view.

(1) A time delay is difficult to implement.

(2) The controller does not work successfully when either a state output value, a known dynamics value or an input distribution matrix value changes quickly.

(3) A reference model is not useful when an output of a physical plant should continuously follow a certain desired trajectory defined as a function of time.

SUMMARY OF THE INVENTION

It is the first object of this invention to provide an adaptive control system which is easy to implement.

It is the second object of this invention to provide an adaptive control system which works sufficiently even if either a state output value, a known dynamics value or an input distribution matrix value changes quickly.

It is the third object of this invention to provide an adaptive control system which makes a plant output continuously follow a desired trajectory defined as a function of time.

In order to achieve the first object, the invention provides an adaptive control system, for a plant where its input distribution matrix is known and the number of effective inputs is the same as the number of independent outputs, comprising:

state output detection means for detecting a state output value of a plant;

known dynamics value production means for producing a known dynamics value by substituting said state output value of said plant into a known part of a dynamic equation of said plant;

unknown dynamics value production means for producing an unknown dynamics value by adding a derivative value of said state output value of said plant, negative quantity of multiplication of an input value of said plant and an input distribution matrix value of said plant, and negative quantity of said known value;

non-identity filtering means, except for a time delay element, for producing a filtered unknown dynamics value which is close to but not exactly the same as said unknown dynamics value;

reference state output production means for producing a state output value of a reference model by substituting an input value of said reference model into a dynamic equation of said reference model;

error value production means for producing an error value by subtracting said state output value of said plant from said state output value of said reference model;

error dynamics adjustment value production means for producting an error dynamics adjustment value by multiplying said error value and a value of an error dynamics adjustment matrix;

reference model dynamics value production means for producing a reference model dynamics value by adding multiplication of said state output value of said plant and a system matrix value of said reference model, and multiplication of an input value of said reference model and an input distribution matrix value of said reference model;

value summation means for producing a summed value by adding negative quantity of said known dynamics value, negative quantity of said filtered unknown dynamics value, said reference model dynamics value, and negative quantity of said error dynamics adjustment value; and control input value production means for producing a control input value to said plant by multiplying said summed value and a pseudo-inverse matrix value of said input distribution matrix of said plant.

In order to achieve the second object, the invention provides an adaptive control system, for a plant where its input distribution matrix is known and the number of effective inputs is the same as the number of independent outputs, comprising:

state output detection means for detecting a state output value of a plant;

non-identity filtering means for producing a filtered plant input value which is close to but not exactly the same as an input value of said plant;

adaptive value production means for producing an adaptive value by subtracting multiplication of said filtered input value and an input distribution matrix value of said plant from a derivative value of said state output value of said plant;

reference state output production means for producing a state output value of a reference model by substituting an input value of said reference model into a dynamic equation of a reference model;

error value production means for producing an error value by subtracting said state output value of said plant from said state output value of said reference model;

error dynamics adjustment value production means for producting an error dynamics adjustment value by multiplying said error value and a value of an error dynamics adjustment matrix;

reference model dynamics value production means for producing a reference model dynamics value by adding multiplication of said state output value of said plant and a system matrix value of said reference model, and multiplication of an input value of said reference model and an input distribution matrix value of said reference model;

value summation means for producing a summed value by adding negative quantity of said adaptive value, said reference model dynamics value, and negative quantity of said error dynamics adjustment value; and control input value production means for producing a control input value to said plant by multiplying said summed value and a pseudo-inverse matrix value of said input distribution matrix of said plant.

In order to achieve the third object, the invention provides an adaptive control system, for a plant where its input distribution matrix is known and the number of effective inputs is the same as the number of independent outputs, comprising:

state output detection means for detecting a state output value of a plant;

known dynamics value production means for producing a known dynamics value by substituting said state output value of said plant into a known part of a dynamic equation of said plant; unknown dynamics value production means for producing an unknown dynamics value by adding a derivative value of said state output value of said plant, negative quantity of multiplication of an input value of said plant and an input distribution matrix value of said plant, and negative quantity of said known dynamics value;

non-identity filtering means for producing a filtered unknown dynamics value which is close to but not exactly the same as said unknown dynamics value;

error value production means for producing an error value by subtracting said state output value of said plant from a desired state output value defined as a function of time;

desired error dynamics value production means for producing a desired error dynamics value by multiplying said error value and a desired error dynamics matrix value;

value summation means for producing a summed value by adding negative quantity of said known dynamics value, negative quantity of said filtered unknown dynamics value, negative quantity of said desired error dynamics value and a derivative value of said desired state output value; and control input value production means for producing a control input value to said plant by multiplying said summed value and a pseudo-inverse matrix value of said input distribution matrix of said plant.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
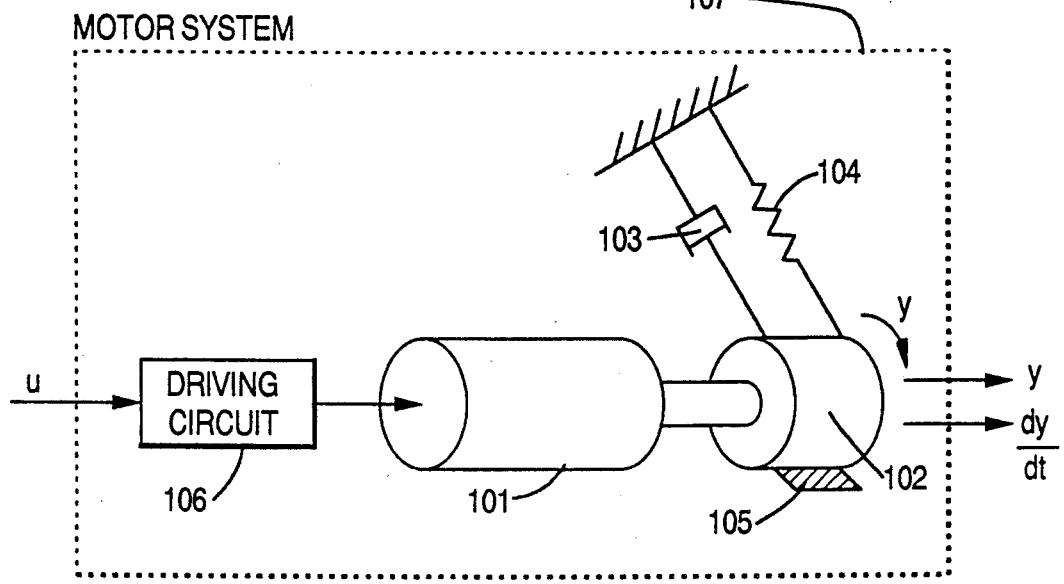
FIG. 1 is a schematic view showing a conventional motor system which is controlled by an adaptive control system of the present invention.
Figure 2:
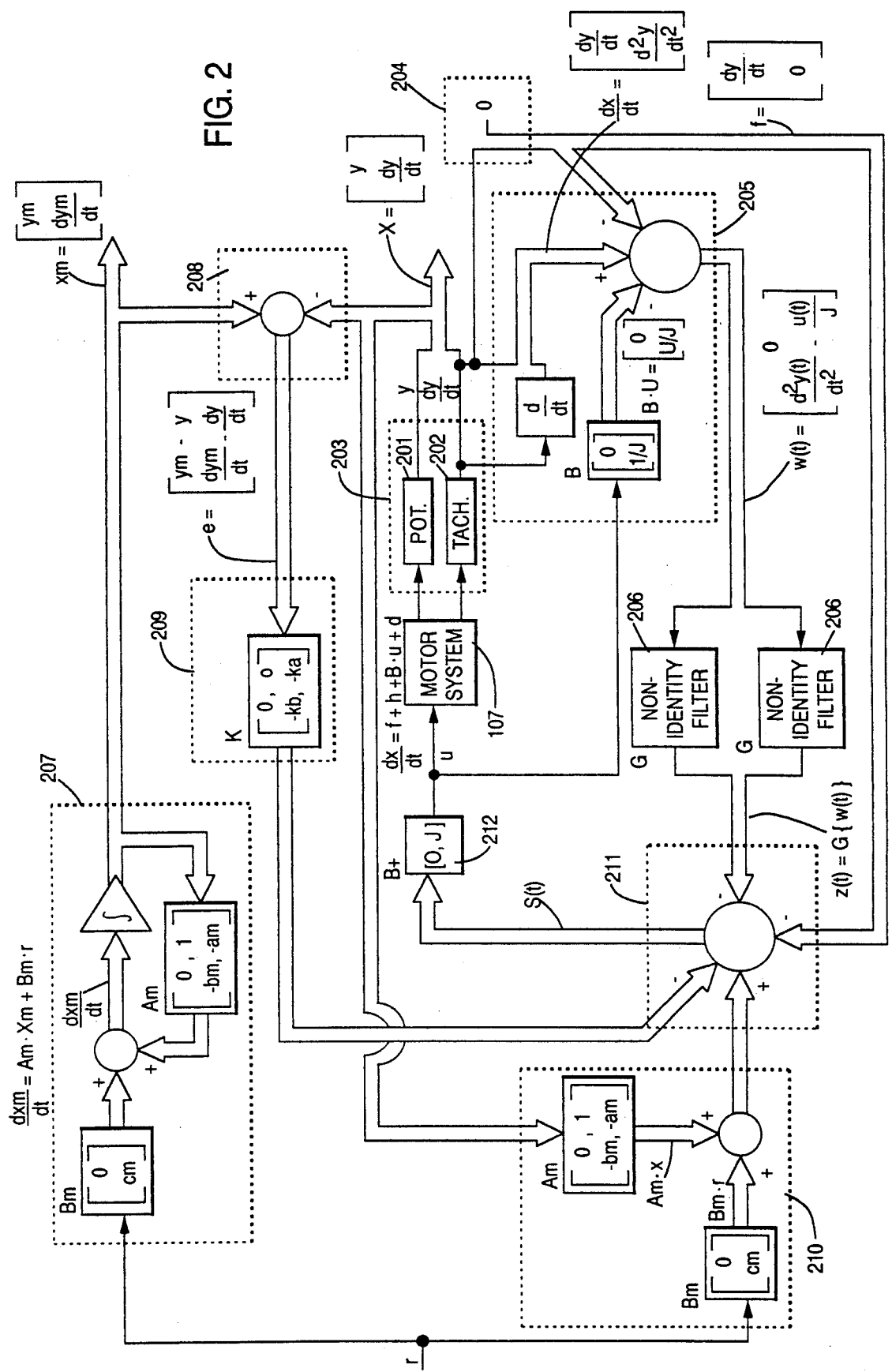
FIG. 2 is a block diagram of a servo system embodying the present invention.

A servo system of the present invention in FIG. 2 uses a conventional motor system as a controlled physical plant whose schematic view is shown in FIG. 1. In FIG. 1, 101 is a motor, 102 is a rotor with a known inertia "J", 103 is a damper with an unknown damping coefficient "a", 104 is a spring with an unknown spring coefficient "b", 105 is a friction board which applies unknown dry friction "$u_d$", 106 is a driving circuit, and 107 is a motor system which consists of elements 101 through 106. Also, "y" and "u" represent a rotation angle and an applied torque, respectively, of motor system 107. Dynamic equation of motor system 107 is simply expressed as the following:

$$J(d^2y/dt^2) + a(dy/dt) + b^*y = u + u_d \qquad (1)$$

Eq. (1) can be expressed in a state space form as the following:

$$(d/dt)x(t) = f(x,t) + h(x,t) + B(x,t)u(t) + d(t) \qquad (2)$$

where
$x = [y, (dy/dt)]^T$ is a state output,
$f = [(dy/dt), 3]^T$ is a known part of the dynamic equation,
$h = [0, -(a/J)^*(dy/dt) - (b/J)^*y]^T$ is an unknown part of the dynamic equation,
$B = [0, (1/J)]^T$ is a known input distribution matrix, and
$d = [0, u_d(t)/J]^T$ is an unknown disturbance.

In motor system 107, the input distribution matrix "B" is known and there are a single effective input "u" and a single independent output "y".

In FIG. 2, state output measurement device 203, which consists of potential meter 201 and tachometer 202, measures a state output of motor system 107, "$x(t) = [y(t), dy(t)/dt]^T$". Known dynamics value production circuit 204 produces known dynamics value "f(x,t)" by substituting the above measured "x(t)" into "f(x,t)" in Eq. (2). Unknown dynamics value production circuit 205 produces an unknown dynamics value "w(t)" by adding derivative value of the measured state output "dx(t)/dt", negative quantity of the known value "f(x,t)", negative quantity of multiplication of input "u" of motor system 107 and the known input distribution matrix value "B(x,t)". That is, $$w(t) = dx(t)/dt - f(x,t) - B(x,t)u(t) \quad (3)$$

It is simply confirmed by combining Eqs. (2) and (3), the produced unknown dynamics value "w(t)" is exactly equal to an unknown dynamics value "h(x,t)+d(t)". Non-identity filters 206 filter the unknown dynamics value "w(t)" into a filtered unknown dynamics value "z(t)". That is, $$z(t) = G\{w(t)\} \quad (4)$$

where "G{ }" represents a transfer function of non-identity filter 206.

It is clear that the filtered unknown dynamics value "z(t)" exactly represents the actual unknown dynamics value of motor system 107, if the following condition is satisfied:

$$G(s) = 1, \text{ for all frequencies.} \quad (5)$$

Reference model state output circuit 207 produces a state output value of a reference model, $x_m = [y_m, dy_m/dt]^T$, based on the following equation:

$$(d/dt)x_m(t) = A_m x_m(t) + B_m r(t) \quad (6)$$

where
$A_m$ is a system matrix,
$B_m$ is an input distribution matrix, and
r is an input.

Error value production circuit 208 produces an error value "e(t)" by subtracting the above measured "x(t)" from the above produced "$x_m(t)$". That is, $$e(t) = x_m(t) - x(t). \quad (7)$$

Error dynamics adjustment value production circuit 209 produces an error dynamics adjustment value "K*e(t)", where "K" is an error dynamics adjustment matrix.

Reference model dynamics value production circuit 210 produces a reference model dynamics value "$A_m x(t) + B_m r(t)$", using the state output value "x(t)" measured by state output measurement device 203.

Value summation circuit 211 produces a summed value "s(t)", using the above measured or produced value by known dynamics value production circuit 204, non-identity filter 206, reference model dynamics value production circuit 210 and error dynamics adjustment value circuit 209. That is, $$s(t) = -f(x,t) - z(t) + A_m x(t) + B_m r(t) - K^* e(t). \quad (8)$$

Finally, control input value production circuit 212 produces a control input value "u(t)" based on the following equation:

$$u(t) = B^+(x,t)^* s(t) \quad (9)$$

$$= B^+(x,t)\{-f(x,t) - z(t) + A_m x(t) + B_m r(t) - K^* e(t)\}$$

where
$B^+ = (B^T B)^{-1} B^T = [0, J]$ is a pseudo-inverse matrix of B.

Unknown dynamics value production circuit 205 consists of addition, multiplication and differentiation. Reference model state output circuit 207 consists of addition, multiplication and integration. Error value production circuit 208 consists of addition. Error dynamics adjustment value production circuit 209 consists of multiplication. Reference model dynamics value production circuit 210 consists of addition and multiplication. Value summation circuit 211 consists of addition. Control input value production circuit 212 consists of multiplication. Therefore, all these elements 205 and 207 through 212 can be implemented by using operational amplifiers, digital circuits and/or computer program.

In Eq. (9), which represents adaptive control law of the present invention, each term has the following function:

"$B^+$", which appears due to control input value production circuit 212, cancels an input distribution matrix "B" of motor system 107;

"$-f$", which appears due to known dynamics value production circuit 204, cancels undesired known dynamics;

"$-z$", which appears due to non-identity filter 206, tries to cancel undesired known dynamics and disturbance;

"$A_m x + B_m r$", which appears due to reference model dynamics value production circuit 210, inserts desired dynamics of a reference model; and "$-K^* e$", which appears error dynamics adjustment value production circuit 209, adjusts error dynamics into the following desired dynamic equation:

$$de(t)/dt = A_e^* e(t) \quad (10)$$

where $A_e = A_m + K$ is a system matrix of desired error dynamics.

Eq. (10) can be obtained by substitution of Eq. (9) into Eq. (2) followed by straight forward algebraic manipulation using Eqs. (3) through (7).

In the above explanation, it was shown that a transfer function "G{ }" of non-identity filter 206 should satisfy Eq. (5) for precise estimation. However, it is not clarified yet whether or not it is able to implement an adaptive control system using the filtered unknown dynamics value "z(t)" produced by non-identity filter 206.

Figure 4B:
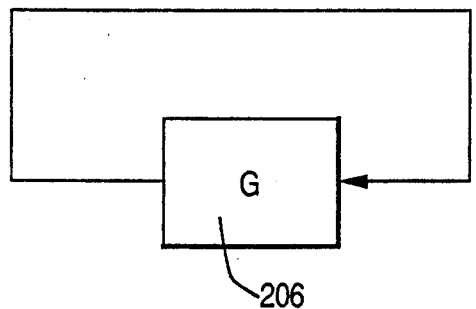
FIGS. 4a and 4b are simplified block diagrams of FIGS. 3a and 3b, respectively.
Figure 4A:
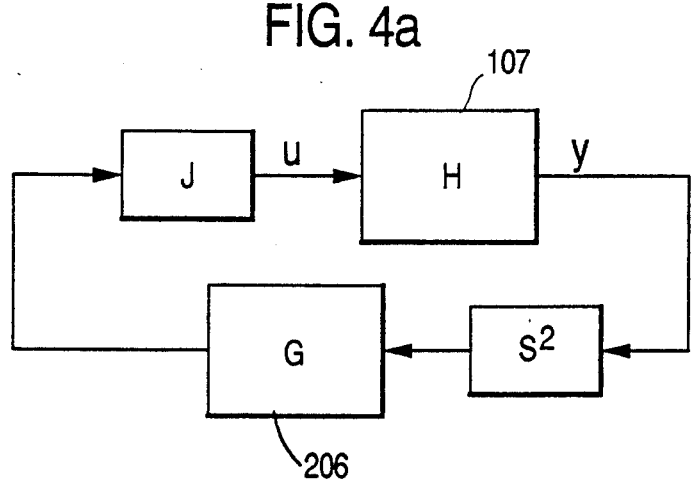
Figure 3A:
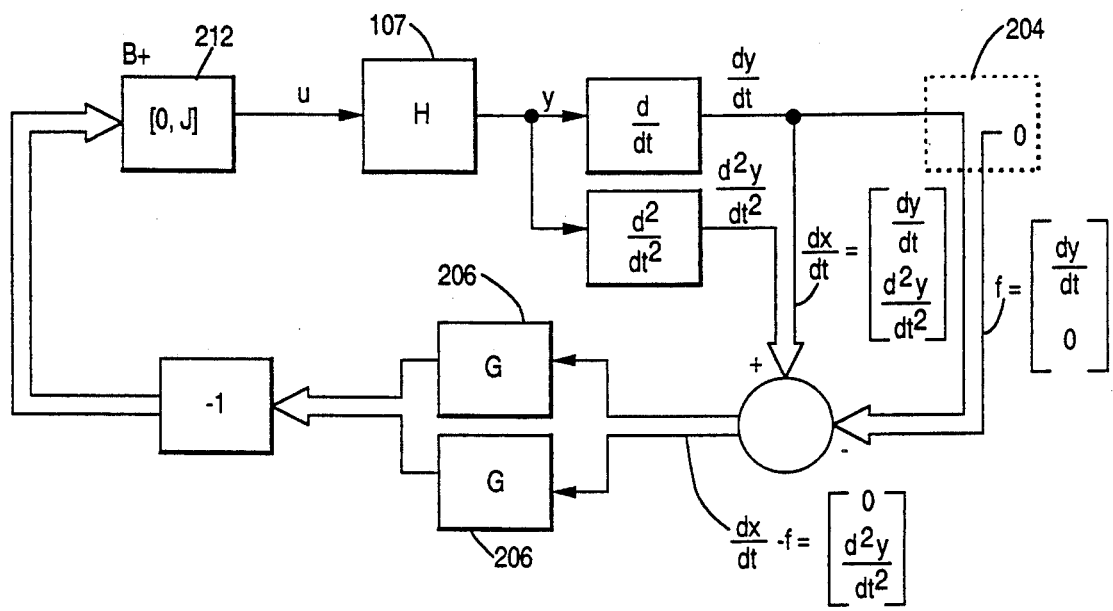
FIGS. 3a and 3b are block diagrams showing feedback loops in FIG. 2.
Figure 3B:
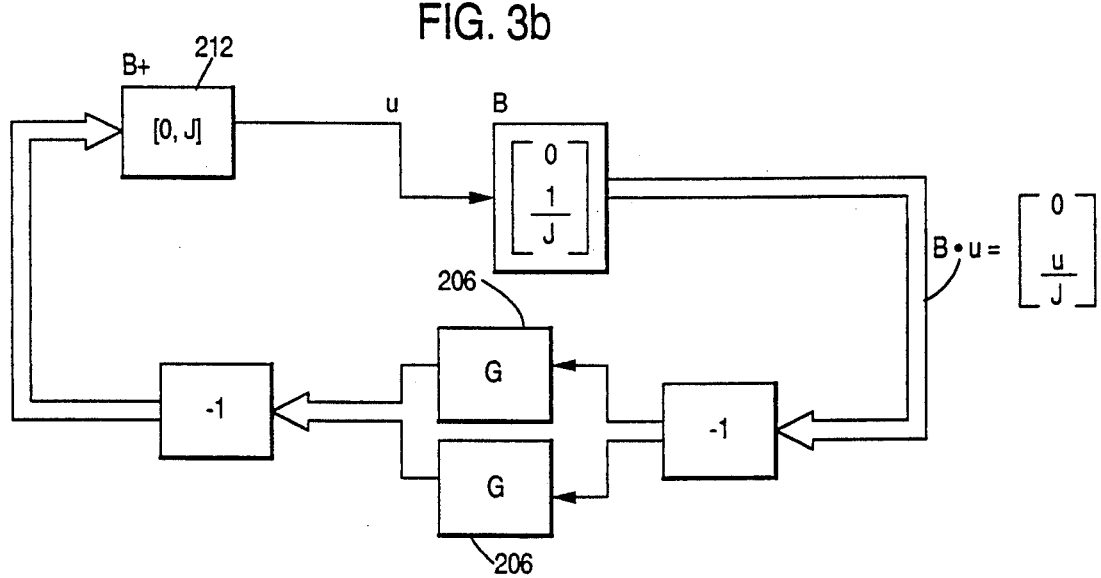

FIGS. 3a and 3b show feedback loops which have connection with non-identity filter 206 in FIG. 2. In FIGS. 3a and 3b, "H" represents a transfer function of motor system 107. FIGS. 3a and 3b can be simplified as FIGS. 4a and 4b, respectively. From FIGS. 4a and 4b, conditions can be derived as the following, respectively, for an adaptive control system to be able to implemented.

$$1 - s^2 * J * G(s) * H(s) \neq 0, \text{ for a certain frequency} \quad (11)$$

$$1 - G(s) \neq 0, \text{ for a certain frequency} \quad (12)$$

Eq. (11) contain "H", a transfer function of motor system 107 and there is almost no possibility that the left hand side of the equation is exactly zero for all frequencies. Therefore, it is rational that Eq. (11) are always satisfied and that Eq. (12) is a single condition in order for the adaptive control system to be able to be implemented. The following equation can be simply derived from Eq. (12).

$$G(s) \neq 1, \text{ for a certain frequency.} \quad (13)$$

It is clear that Eq.(13), the condition for implementation and Eq.(5), the condition for precise estimation can not be simultaneously satisfied. Therefore, the following practical condition can be obtained by relaxing the condition of Eq.(5).

$$G(s) \approx 1, \text{ for all certain necessary frequencies, and}$$

$$G(s) \neq 1, \text{ for a certain unnecessary frequency.} \quad (14)$$

A filter "G" in Eq.(20) produces an output which is close to, but not exactly the same to an input, and there are many such filters as shown in FIGS. 5 through 9.

Figure 5A:
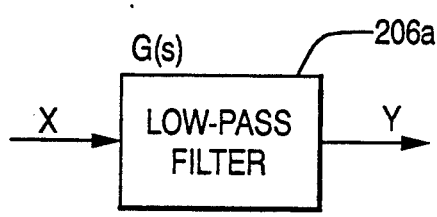
FIGS. 5a through 5c are a block diagram, a frequency response diagram and a time response diagram, respectively, of a low-pass filter which is used as a non-identity filter in FIG. 2.
Figure 5B:
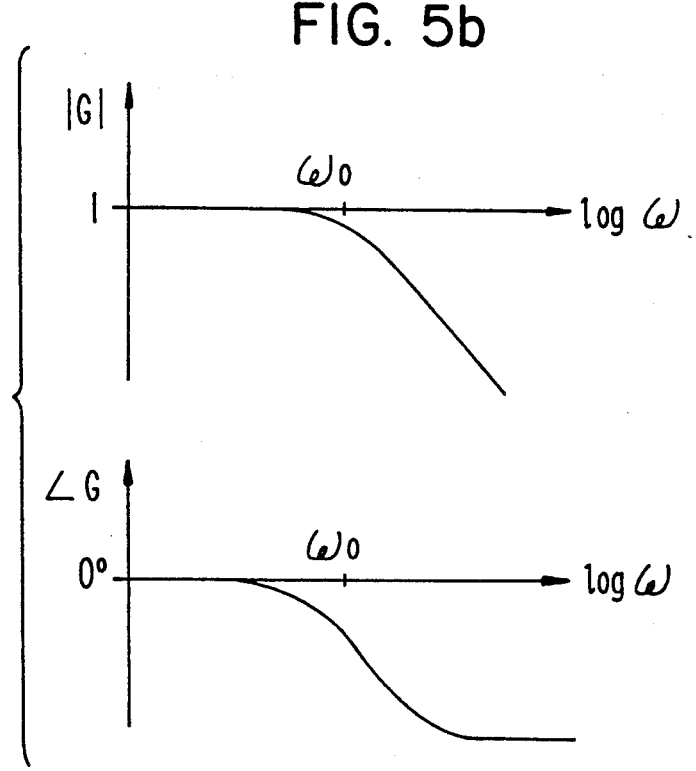
Figure 5C:
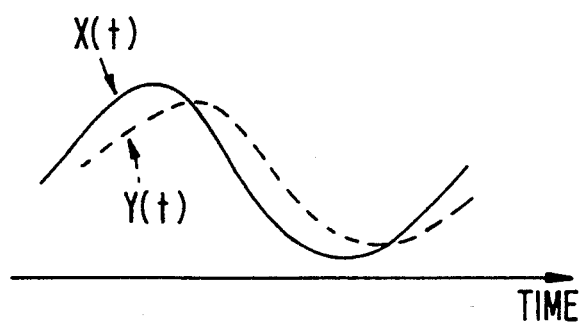

FIGS. 5a through 5c show a block diagram, frequency response and time response of low-pass filter 206a which embodies non-identity filter 206 in FIG. 2. In many practical situations, unknown dynamics and disturbances exist in low frequencies and low pass filter 206a is an appropriate embodiment for such cases.

Figure 6A:
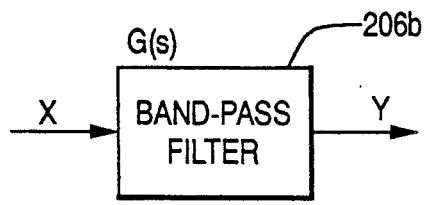
FIGS. 6a through 6c are a block diagram, a frequency response diagram and a time response diagram, respectively, of a band-pass filter which is used as a non-identity filter in FIG. 2.
Figure 6B:
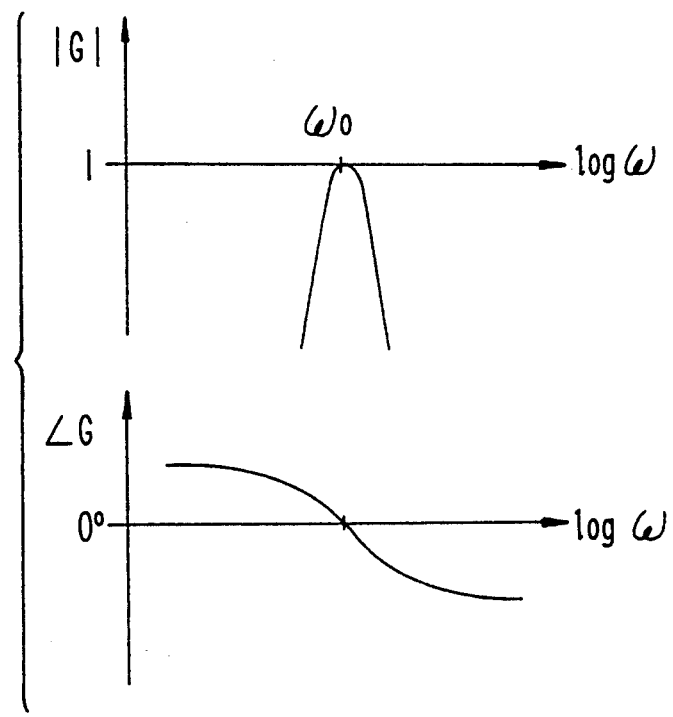
Figure 6C:
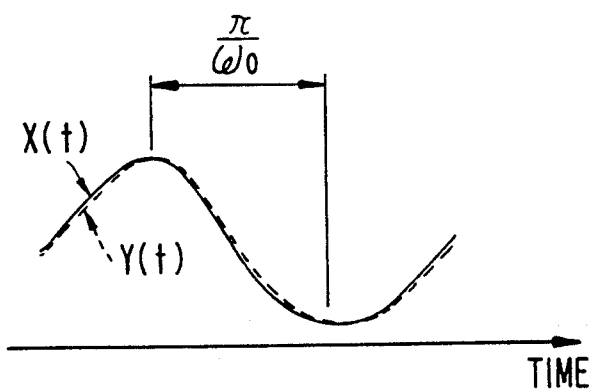

FIGS. 6a through 6c show a block diagram, frequency response and time response of band-pass filter 206b which embodies non-identity filter 206 in FIG. 2. In some practical situations, an amplitude of disturbance is not known, but its frequency is known. For such cases, band-pass filter 206b is an appropriate embodiment.

Figure 7A:
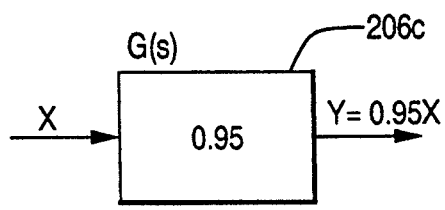
FIGS. 7a through 7c are a block diagram, a frequency response diagram and a time response diagram, respectively, of a constant gain which is used as a non-identity filter in FIG. 2.
Figure 7B:
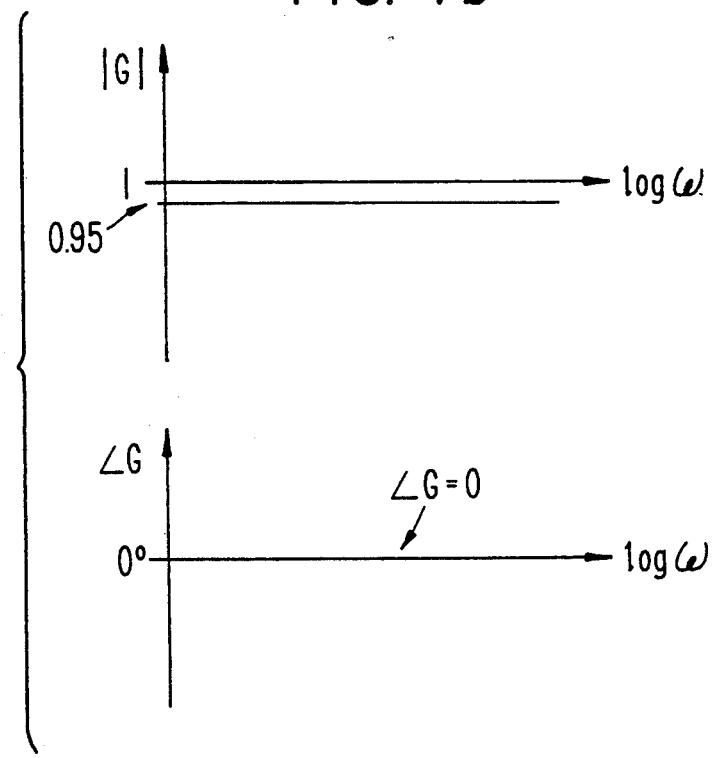
Figure 7C:
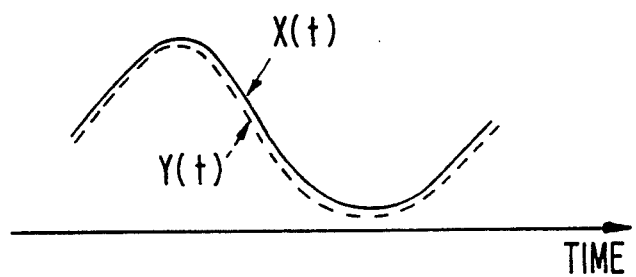

FIGS. 7a through 7c show a block diagram, frequency response and time response of non-unity-gain filter 206c which embodies non-identity filter 206 in FIG. 2. In some practical situations, unknown dynamics and disturbances changes very quickly, therefore it is more important that canceling the uncertainties in respect of its phase than its amplitude. Non-unity-gain filter 206c is an appropriate embodiment for such cases.

Figure 8A:
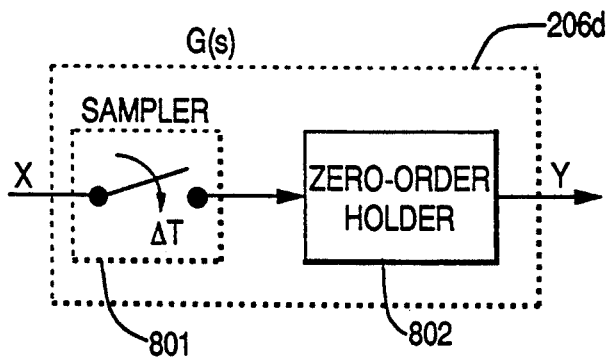
FIGS. 8a through 8c are a block diagram, a frequency response diagram and a time response diagram, respectively, of combination of a sampler and a zero-order-holder which is used as a non-identity filter in FIG. 2.
Figure 8B:
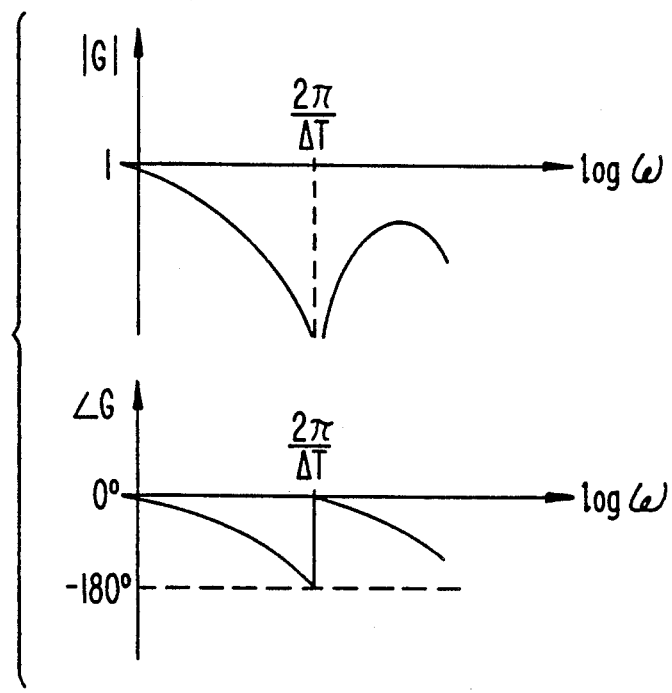
Figure 8C:
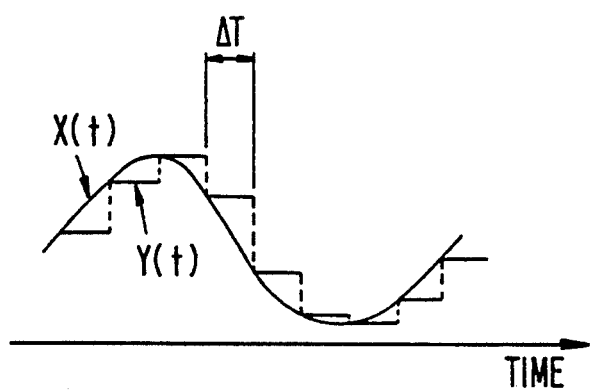

FIGS. 8a through 8c show a block diagram, frequency response and time response of a combination 206d of a sampler 801 and a zero-order-holder (ZOH) 802 which combination embodies non-identity filter 206 in FIG. 2. In many practical situations, an adaptive controller of this invention is implemented using digital circuits because of its high reliability. Since a combination 206d of a sampler 801 and a ZOH holder 802 is a standard element of digital circuits, it is an appropriate embodiment for such cases.

Figure 9A:
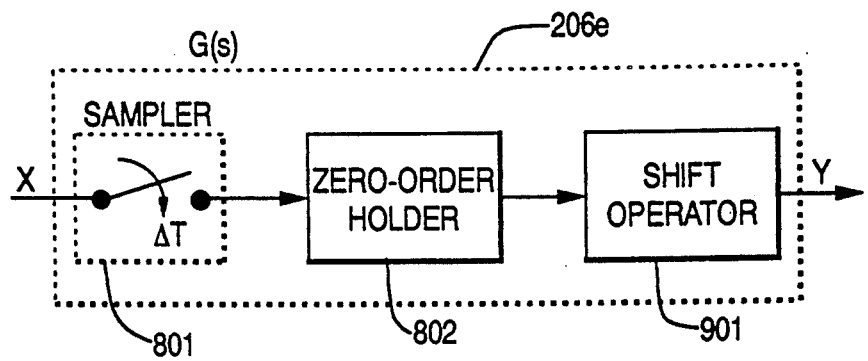
FIGS. 9a through 9c are a block diagram, a frequency response diagram and a time response diagram, respectively, of combination of a sampler, a zero-order-holder and a shift operator which is used as a non-identity filter in FIG. 2.
Figure 9B:
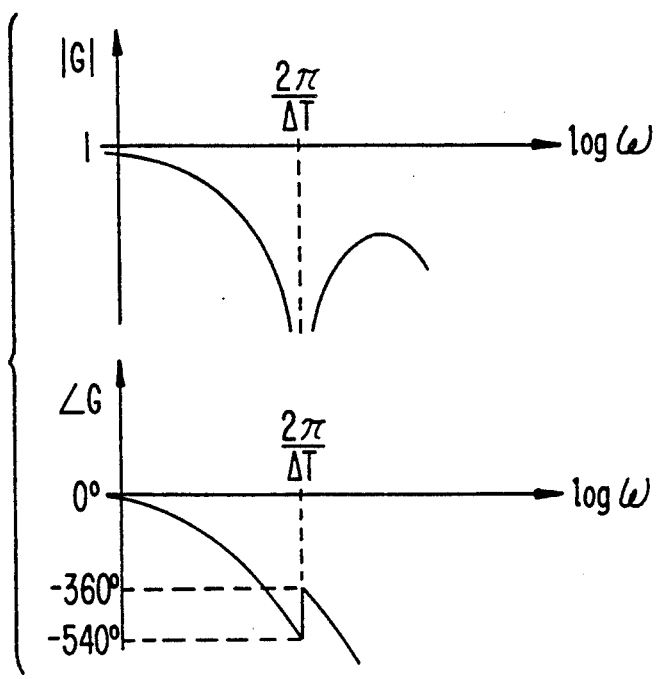
Figure 9C:
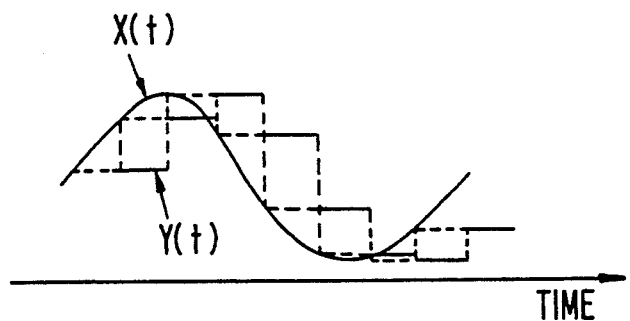

FIGS. 9a through 9c show a block diagram, frequency response and time response of a combination 206e of a sampler 801, a ZOH holder 802 and a shift operator 901 which combination embodies non-identity filter 206 in FIG. 2. By using computer program, it makes much easier to implement an adaptive controller of this invention because the adaptive control law of Eq.(9) can be directly written. However, in this case, time of the estimation and time of applying the control input signal have to be separated by an amount of a sampling time in order the computer program to finish its calculation. Therefore, element 206e is an appropriate embodiment for such cases.

Figure 10A:
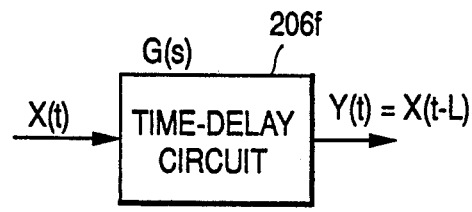
FIGS. 10a through 10c are a block diagram, a frequency response diagram and a time response diagram, respectively, of a time-delay circuit which is used as a non-identity filter in a conventional adaptive control system.
Figure 10B:
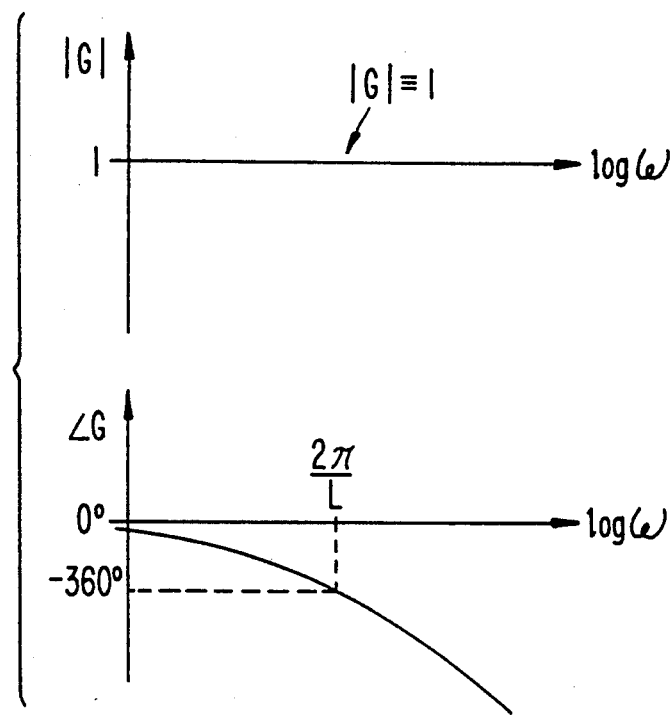
Figure 10C:
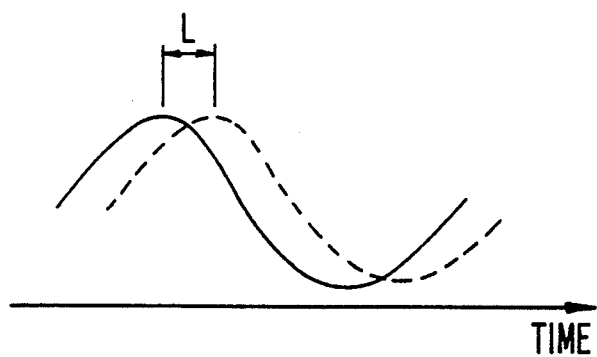

In contrast with the above explained an adaptive control system of the present invention, the conventional adaptive control system, which was proposed in the above referred paper by YOUCEF-TOUMI and ITO, did not clarify condition of Eq.(14) and gave an only single embodiment—a time delay circuit—as shown in FIGS. 10a through 10c, thus making difficult to implement an adaptive control system.

Figure 11:
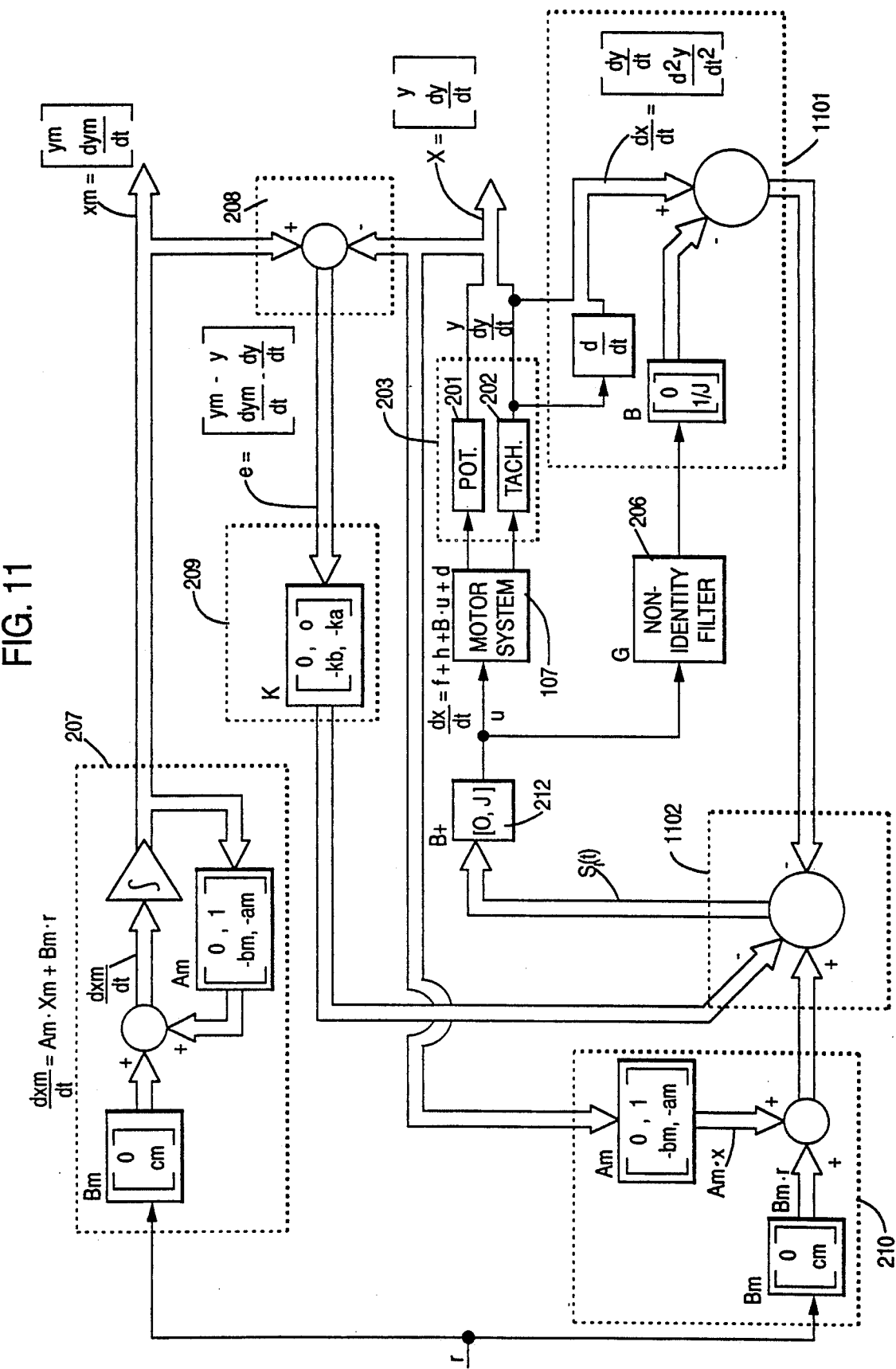
FIGS. 11 through 13 are block diagrams of other servo systems embodying the present invention.

FIG. 11 shows another embodiment of an adaptive control system of the present invention. In FIG. 11, state output detection device 203 measures a state output of motor system 107, "$x(t)=[y(t),dy(t)/dt]T$". Non-identity filter produces a filtered plant input value which is close to but is not exactly the same as the plant input value. Adaptive value production circuit produces an adaptive value "$z_1(t)$" based on the following equation:

$$z_1(t) = dx(t)/dt - B^*G\{u(t)\} \quad (15)$$

An reference model dynamics value "$A_m x + B_m r$" and an error dynamics adjustment value "$K^*e$" are obtained in the same way as in FIG. 2. Value summation circuit produces a summed value "$s_1(t)$" based on the following equation:

$$s_1(t) = -z_1(t) + A_m x(t) + B_m r(t) - K^* e(t) \quad (16)$$

Finally, control input value production circuit 212 produces a control input value "u(t)" based on the following equation:

$$u(t) = B^+(x,t)^* s_1(t) \quad (17)$$

An adaptive control system of FIG. 11 has the following two major differences, if compared with one of FIG. 2:

(1) The number of non-identity filter 206 is reduced to one, and it is located right after plant input "u".

(2) Known dynamics value production circuit 204 is eliminated. These are because:

(1) In order to be able to implement an adaptive control system of the present invention, it is clear that non-identity filter 206 can be located anywhere in the feedback loop of FIG. 3b. Therefore, if non-identity filter is put right after plant input "u", only one filter is necessary.

(2) If it is put at the location, a value of "f" due to known dynamics value production circuit 204 in FIG. 2 and a value of "f" contained in "z" in FIG. 2 are completely canceled in value summation circuit 211 in FIG. 2. Therefore, known dynamics value production circuit 204 is not necessary anymore.

An adaptive control system in FIG. 11 does not filter "B(x,t)", "dx(t)/dt" and "f(x,t)". Therefore, even if these three values changes quickly, the controller gives more precise estimation than a controller in FIG. 2.

Also, all filters shown in FIGS. 5 through 9, or a time delay circuit in FIG. 10 if necessary, can be used as non-unity filter 206 in the adaptive control system in FIG. 11.

Figure 12:
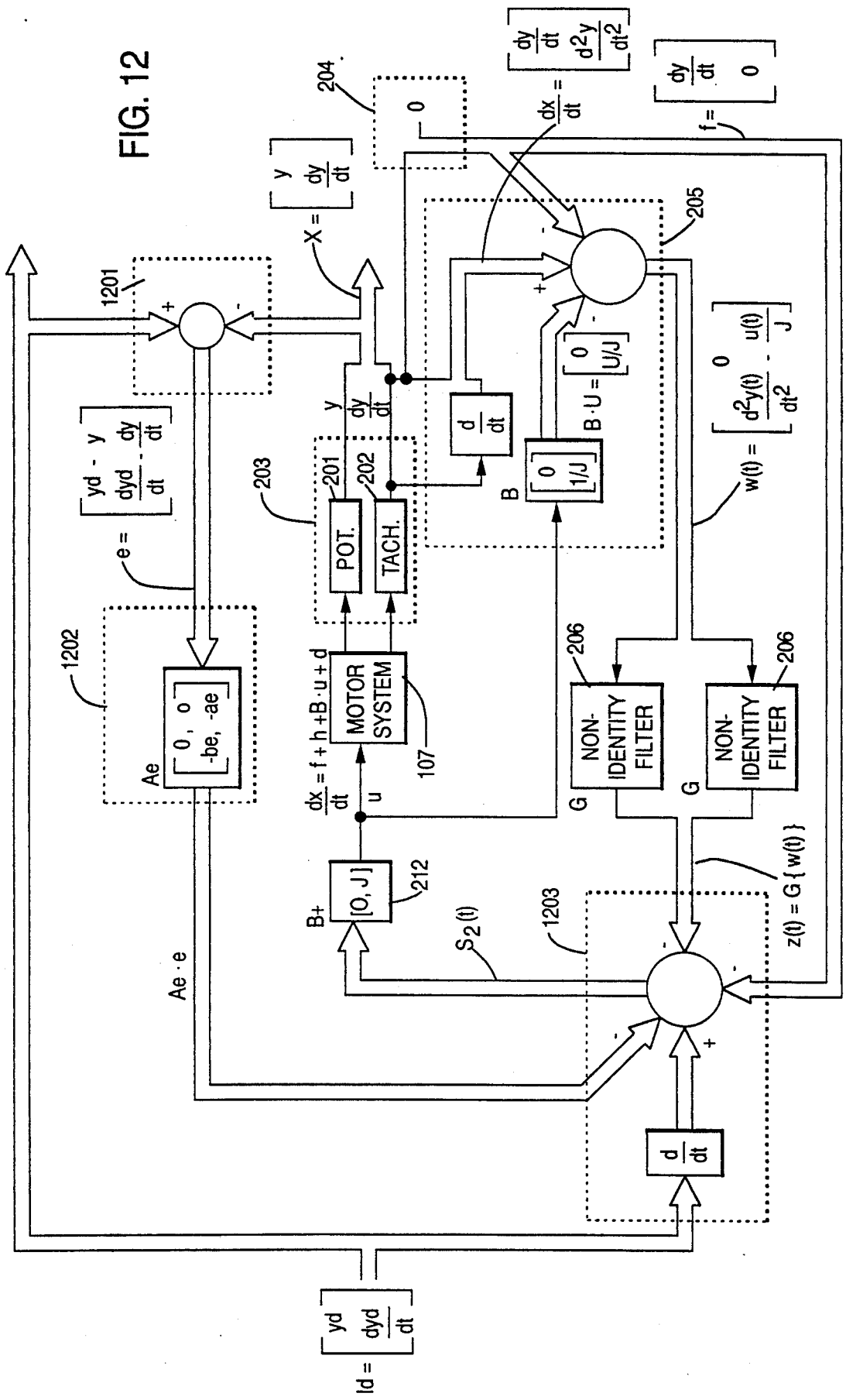

FIG. 12 shows another embodiment of the present invention. To facilitate the understanding of the embodiment, a brief explanation based on equations will be made in the following:

Term "$A_m x(t) + B_m r(t) - K^*e(t)$" which appears in Eq.(8) can be transformed as the following equation:

$$A_m x(t) + B_m r(t) - K^* e(t)$$

By using Eq.(7) in the above line;

$$= A_m x(t) + B_m r(t) - K\{x_m(t) - x(t)\}$$

By adding "$A_m x_m - A_m x_m = 0$" to the above line;

$$= A_m x(t) + B_m r(t) - K\{x_m(t) - x(t)\} + A_m x_m - A_m x_m$$

By organizing the above line;

$$=A_m x_m(t)+B_m r(t)-(A_m+K)\{x_m(t)-x(t)\}$$

By using Eqs.(6) and (7) in the above line;

$$=(d/dt)x_m(t)-(A_m+K)e(t)$$

By using Eq.(10) in the above line;

$$=(d/dt)x_m(t)-A_e e(t) \tag{18}$$

By substituting Eq.(18) into Eq.(8), the following equation is obtained:

$$s(t)=-f(x,t)-z(t)+dx_m(t)/dt-A_e e(t) \tag{19}$$

Eq.(8) and Eq.(19) are exactly the same from a mathematical point of view, but they are different from a practical point of view since Eq.(19) does not contain "$A_m$" or "$B_m$" which define a reference model of Eq.(6). Therefore, if Eq.(19) is used instead of Eq.(8), reference model state output circuit 207 in FIG. 2 can be eliminated, and thus "$x_m(t)$" can be any desired state output trajectory which motor system 107 should continuously follow. In order to clarify this point, "$x_m(t)$" in Eq.(19) is replaced by "$x_d(t)$" and the following equation is obtained.

$$s_2(t)=-f(x,t)-z(t)+dx_d(t)/dt-A_e e(t) \tag{20}$$

where $x_d(t)$ is a desired state output, which $x(t)$ should continuously follow.

Accordingly, error should be defined as the following:

$$e(t)=x_d(t)-x(t) \tag{21}$$

In FIG. 12, known dynamics value "$f(x,t)$" and filtered unknown dynamics value "$z(t)$" is obtained in the same way as in FIG. 2. By using Eq.(21), error value production circuit 1201 produces an error value "$e(t)$" by subtracting a desired state output "$x_d(t)$" from a measured state output "$x(t)$". A desired error dynamics matrix "$A_e$" is then multiplied by the error value "$e(t)$" in desired error dynamics value production circuit 1202, producing desired error dynamics value "$A_e*e(t)$". Based on Eq.(20), value summation circuit 1203 produces a summed value "$s_2(t)$". Finally, control input value production circuit 212 produces a control input value "$u(t)$" to motor system 107 in the same way as in FIG. 2.

Figure 13:
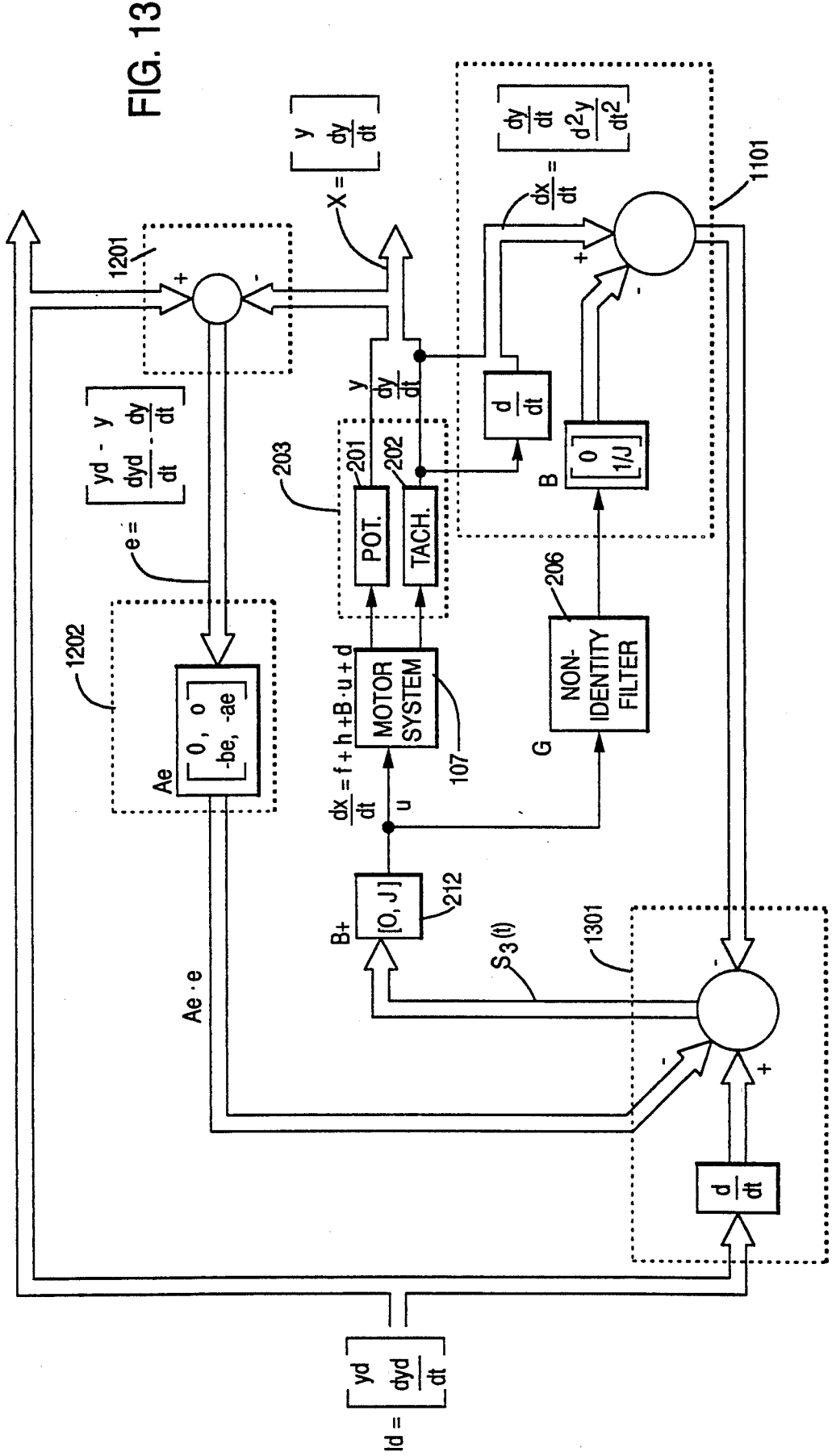

From the above explanation, it is clear that another adaptive control system can be embodied if adaptive control systems of FIG. 11 and 12 are combined. This is shown in FIG. 13.

In the all above explanation, a single-input and single-output servo motor system was used as an example of controlled physical plants. However, it is clear that an adaptive control system of the present invention can be used to control other physical plants such as a heat pump, a chemical reactor or a multiple-input and multiple-output robot manipulators.

What is claimed is:

1. An adaptive control system, for a plant where its input distribution matrix is known and a number of effective inputs is the same as a number of independent outputs, comprising:
   state output detection means for detecting a state output value of a plant;
   known dynamics value production means for producing a known dynamics value by substituting said state output value of said plant into a known part of a dynamic equation of said plant;
   unknown dynamics value production means for producing an unknown dynamics value by adding a derivative value of said state output value of said plant, negative quantity of multiplication of an input value of said plant and an input distribution matrix value of said plant, and negative quantity of said known value;
   non-identity filtering means, except for a time delay element, for producing a filtered unknown dynamics value which is close to but not exactly the same as said unknown dynamics value;
   reference state output production means for producing a state output value of a reference model by substituting an input value of said reference model into a dynamic equation of said reference model;
   error value production means for producing an error value by subtracting said state output value of said plant from said state output value of said reference model;
   error dynamics adjustment value production means for producing an error dynamics adjustment value by multiplying said error value and a value of an error dynamics adjustment matrix;
   reference model dynamics value production means for producing a reference model dynamics value by adding multiplication of said state output value of said plant and a system matrix value of said reference model, and multiplication of an input value of said reference model and an input distribution matrix value of said reference model;
   value summation means for producing a summed value by adding negative quantity of said known dynamics value, negative quantity of said filtered unknown dynamics value, said reference model dynamics value, and negative quantity of said error dynamics adjustment value; and
   control input value production means for producing a control input value to said plant by multiplying said summed value and a pseudo-inverse matrix value of said input distribution matrix of said plant.

2. An adaptive control system as claimed in claim 1, in which said non-identity filtering means comprises a low-pass filter for producing a filtered unknown dynamics value which is almost the same as said unknown dynamics value for low frequencies.

3. An adaptive control system as claimed in claim 1, in which said non-identity filtering means comprises a band-pass filter for producing a filtered unknown dynamics value which is the same as said unknown dynamics value at a certain frequency.

4. An adaptive control system as claimed in claim 1, in which said non-identity filtering means comprises a non-unity-gain filter for producing a filtered unknown dynamics value which is the same as said unknown dynamics value in terms of phase.

5. An adaptive control system as claimed in claim 1, in which said non-identity filtering means comprises a combination of a sampler for producing a sampled value of said unknown dynamics value, and a zero-order-holder for producing a filtered unknown dynamics value which is equal to said sampled value for a sampling period.

6. An adaptive control system as claimed in claim 1, in which said non-identity filtering means comprises a combination of a sampler for producing a sampled value of said unknown dynamics value, a zero-order-holder for producing a held value which is the same as said sampled value for a sampling period, and a shift operator for producing a filtered unknown dynamics value which is the same as said held value if said unknown dynamics value is shifted into the past by amount of said sampling period.

7. An adaptive control system, for a plant where its input distribution matrix is known and a number of effective inputs is the same as a number of independent outputs, comprising:
   state output detection means for detecting a state output value of a plant;
   non-identity filtering means for producing a filtered plant input value which is close to but not exactly the same as an input value of said plant;
   adaptive value production means for producing an adaptive value by subtracting multiplication of said filtered input value and an input distribution matrix value of said plant from a derivative value of said state output value of said plant;
   reference state output production means for producing a state output value of a reference model by substituting an input value of said reference model into a dynamic equation of a reference model;
   error value production means for producing an error value by subtracting said state output value of said plant from said state output value of said reference model;
   error dynamics adjustment value production means for producing an error dynamics adjustment value by multiplying said error value and a value of an error dynamics adjustment matrix;
   reference model dynamics value production means for producing a reference model dynamics value by adding multiplication of said state output value of said plant and a system matrix value of said reference model, and multiplication of an input value of said reference model and an input distribution matrix value of said reference model;
   value summation means for producing a summed value by adding negative quantity of said adaptive value, said reference model dynamics value, and negative quantity of said error dynamics adjustment value; and
   control input value production means for producing a control input value to said plant by multiplying said summed value and a pseudo-inverse matrix value of said input distribution matrix of said plant.

8. An adaptive control system as claimed in claim 7, in which said non-identity filtering means comprises a low-pass filter for producing a filtered plant input value which is the same as said input value of said plant for low frequencies.

9. An adaptive control system as claimed in claim 7, in which said non-identity filtering means comprises a band-pass filter for producing a filtered plant input value which is the same as said input value of said plant at a certain frequency.

10. An adaptive control system as claimed in claim 7, in which said non-identity filtering means comprises a non-unity-gain filter for producing a filtered plant input value which is the same as said input value of said plant in terms of phase.

11. An adaptive control system as claimed in claim 7, in which said non-identity filtering means comprises a combination of a sampler for producing a sampled value of said input value of said plant, and a zero-order-holder for producing a filtered input value which is equal to said sampled value for a sampling period.

12. An adaptive control system as claimed in claim 1, in which said non-identity filtering means comprises a combination of a sampler for producing a sampled value of said input value of said plant, a zero-order-holder for producing a holded value which is the same as said sampled value for a sampling period, and a shift operator for producing a filtered plant input value which is the same as said holded value if said shifted value is shifted into the past by amount of said sampling period.

13. An adaptive control system as claimed in claim 7, in which said non-identity filtering means comprises a time delay element for producing a filtered plant input value which is delayed from said input value of said plant by a certain amount of time.

14. An adaptive control system, for a plant where its input distribution matrix is known and a number of effective inputs is the same as a number of independent outputs, comprising:
   state output detection means for detecting a state output value of a plant;
   known dynamics value production means for producing a known dynamics value by substituting said state output value of said plant into a known part of a dynamic equation of said plant;
   unknown dynamics value production means for producing an unknown dynamics value by adding a derivative value of said state output value of said plant, negative quantity of multiplication of an input value of said plant and an input distribution matrix value of said plant, and negative quantity of said known dynamics value;
   non-identity filtering means for producing a filtered unknown dynamics value which is close to but not exactly the same as said unknown dynamics value;
   error value production means for producing an error value by subtracting said state output value of said plant from a desired state output value defined as a function of time;
   desired error dynamics value production means for producing a desired error dynamics value by multiplying said error value and a desired error dynamics matrix value;
   value summation means for producing a summed value by adding negative quantity of said known dynamics value, negative quantity of said filtered unknown dynamics value, negative quantity of said desired error dynamics value and a derivative value of said desired state output value; and
   control input value production means for producing a control input value to said plant by multiplying said summed value and a pseudo-inverse matrix value of said input distribution matrix of said plant.

15. An adaptive control system as claimed in claim 14, in which said non-identity filtering means comprises a low-pass filter for producing a filtered unknown dynamics value which is the same as said unknown dynamics value for low frequencies.

16. An adaptive control system as claimed in claim 14, in which said non-identity filtering means comprises a band-pass filter for producing a filtered unknown dynamics value which is the same as said unknown dynamics value at a certain frequency.

17. An adaptive control system as claimed in claim 14, in which said non-identity filtering means comprises a non-unity-gain filter for producing a filtered unknown dynamics value which is the same as said unknown dynamics value in terms of phase.

18. An adaptive control system as claimed in claim 14, in which said non-identity filtering means comprises a combination of a sampler for producing a sampled value of said unknown dynamics value, and a zero-order-holder for producing a filtered unknown dynamics value which is equal to said sampled value for a sampling period.

19. An adaptive control system as claimed in claim 14, in which said non-identity filtering means comprises a combination of a sampler for producing a sampled value of said unknown dynamics value, a zero-order-holder for producing a holded value which is the same as said sampled value for a sampling period, and a shift operator for producing a filtered unknown dynamics value which is the same as said holded value if said unknown dynamics value is shifted into the past by amount of said sampling period.

20. An adaptive control system as claimed in claim 14, in which said non-identity filtering means comprises a time delay element for producing a filtered unknown dynamics value which is delayed from said unknown dynamics value of said plant by a certain amount of time.

* * * * *